(12) United States Patent
Ikunami

(10) Patent No.: US 8,139,170 B2
(45) Date of Patent: Mar. 20, 2012

(54) RETRACTABLE DISPLAY APPARATUS

(75) Inventor: Takahiro Ikunami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 198 days.

(21) Appl. No.: 12/600,816

(22) PCT Filed: Apr. 14, 2008

(86) PCT No.: PCT/JP2008/000979
§ 371 (c)(1),
(2), (4) Date: Nov. 18, 2009

(87) PCT Pub. No.: WO2009/008118
PCT Pub. Date: Jan. 15, 2009

(65) Prior Publication Data
US 2010/0165219 A1  Jul. 1, 2010

(30) Foreign Application Priority Data

Jul. 10, 2007 (JP) ................................. 2007-181104

(51) Int. Cl.
*H04N 5/64* (2006.01)
(52) U.S. Cl. ...................................... 348/836
(58) Field of Classification Search ........................ None
See application file for complete search history.

(56) References Cited

U.S. PATENT DOCUMENTS

| | | | |
|---|---|---|---|
| 5,708,410 A * | 1/1998 | Blank et al. | 340/438 |
| 7,583,184 B2 * | 9/2009 | Schofield et al. | 340/438 |
| 2002/0080297 A1 | 6/2002 | Sung | |

FOREIGN PATENT DOCUMENTS

| | | |
|---|---|---|
| JP | 9-246772 A | 9/1997 |
| JP | 11-266375 A | 9/1999 |
| JP | 2002-508914 A | 3/2002 |
| JP | 2002-524906 A | 8/2002 |
| JP | 2003-323126 A | 11/2003 |
| JP | 2006-282100 A | 10/2006 |
| JP | 2007-13249 A | 1/2007 |
| WO | WO-99/00976 A1 | 1/1999 |
| WO | WO-00/13330 A1 | 3/2000 |
| WO | WO 2007/026450 A1 | 3/2007 |

* cited by examiner

*Primary Examiner* — Nhon Diep
(74) *Attorney, Agent, or Firm* — Birch, Stewart, Kolasch & Birch, LLP

(57) ABSTRACT

A frame cover and a back cover constituting a panel-shaped first casing having an image display surface include a plurality of primary engaging means provided at least in the butt-edge portions on the side to which hinges are attached and engaging between the butt edge portions; and a secondary engaging means located internally in front of a rectangular lock hole in which a movable type lock claw of a second casing is inserted and locked in order to hold the first casing, having a flexible piece extending from one of the covers toward the other thereof, and engaging the other of the covers with the free end of the flexible piece; wherein a fit state where the frame cover and the back cover are combined is established by both the engagements of the primary engaging means and the secondary engaging means, whereas the engagement of the primary engaging means is set in a releasable state by inserting a tool into the rectangular lock hole and inwardly flexing the flexible piece to release the secondary engaging means from the engagement.

6 Claims, 5 Drawing Sheets

RETRACTABLE DISPLAY APPARATUS

CROSS REFERENCE TO RELATED APPLICATIONS

This nonprovisional application claims the benefit of U.S. Provisional Application No. 2007-181104 filed on Jul. 10, 2007 and of JP Patent Application No. 2009-522503 filed in Japan, on May 21, 2009. The entire contents of all of the above applications is hereby incorporated by reference.

TECHNICAL FIELD

The present invention relates to a structure of a casing of a retractable display apparatus, in which a first casing having an image display surface is openably and closably supported by a second casing with a hinge.

BACKGROUND ART

A notebook-sized personal computer and an on-vehicle closable type or retractable display apparatus installed on the ceiling of an automobile vehicle are each composed of a first casing having an image display surface such as a liquid crystal panel and a second casing which openably and closably supports the first casing with hinges. The first casing of such a retractable display apparatus includes a frame cover housing a display member such as a liquid crystal panel and a back cover, and in general, both the covers are combined by screw-holding in consideration of disassembly under fault conditions. However, the screw holding structure results the increased number of man-hours because of the large number of screws and requires sheet-covering over the exposed screw-holding area for concealing the area because of its poor appearance, thus causing an increase in the cost. Therefore, nowadays, included in such retractable display apparatuses are display apparatuses employing an engaging means such as an engaging claw or pawl structure between edge portions where both the covers are butting each other (referred to as a "butt edge portion" hereinafter) (e.g., see Patent Document 1). Since the engaging claw can be molded integral with the casing upon fabricating a casing made of a synthetic resin, the number of parts can be reduced to facilitate an assembly thereof, and also provide a design advantage thereof. Thus, today, engaging claw structures are often used. Further, in the case of employing an engaging claw structure, a notch hole may be formed in a butt edge portion where an engaging means of two covers for constituting a casing is provided, and a tool is inserted into the notch hole to release a flexible piece having an engaging claw from its lock section, thus disassembling easily an assembled casing (see Patent Document 2, for instance).

Patent Document 1: JP-A-9-246772
Patent Document 2: JP-A-2007-013249

As discussed above, the casing structure, where the two covers made of a synthetic resin are combined and assembled by the engaging means molded integral with the casing, requires a hole into which a tool is inserted, for releasing the engaging state at the time of repair. Such a insertion hole is designed to be comparatively small size for consumer products or the like; however, the hole is sometimes conspicuous for its exposure on the exterior. There can arise a problem that a user disassembles the casing by inserting a screw driver or the like thereinto as the user pleases and modifies the interior of the apparatus. Therefore, it is required to provide a hole into which a tool is inserted at a place as unobtrusive as possible.

The present invention has been made to solve the above-mentioned problems, and an object of the present invention is to provide a retractable display apparatus having a casing structure where a hole into which a tool for disassembling the casing is inserted is provided at the place that cannot be easily found.

DISCLOSURE OF THE INVENTION

The retractable display apparatus according to the present invention, includes a panel-shaped first casing having an image display surface and a second casing that openably and closably supports the first casing with hinges; and when the first casing is closed to the side of the second casing, the second casing holds the first casing by inserting and locking a releasably movable type lock claw provided in the second casing, into a rectangular lock hole provided in the side portion of the first casing opposite the side to which the hinges are attached; wherein the first casing, composed of a frame cover and a back cover, includes a plurality of primary engaging means provided at least in the butt edge portions on the side to which the hinges are attached, and engaging the butt edge portions; and a secondary engaging means located internally in front of the rectangular lock hole, having a flexible piece extending from one of the covers toward the other thereof, and engaging the other of the covers with the free end of the flexible piece; and wherein a fit state where the frame cover and the back cover are combined is established by both the engagements of the primary engaging means and the secondary engaging means, while the engagement of the primary engaging means is placed in a releasable state by inserting a tool into the rectangular lock hole and inwardly flexing the flexible piece to release the secondary engaging means from the engagement.

According to the present invention, the rectangular lock hole provided in the first casing, into which the movable type lock claw of the second casing is inserted and locked in order to hold the first casing, is designed to have a structure where the rectangular lock hole can be also used as a hole into which a tool for disassembling the first casing is inserted, and thus the rectangular lock hole is inconspicuous in design. Further, the rectangular lock hole cannot be easily identified as a hole into which a tool is inserted, thus reducing the possibility that a user inserts a screw driver or the like thereinto and disassembles the casing as the user pleases.

BEST MODE FOR CARRYING OUT THE INVENTION

Embodiments of the present invention will now be described with reference to the accompanying drawings in order to explain the present invention in more detail.

First Embodiment

Figure 1:
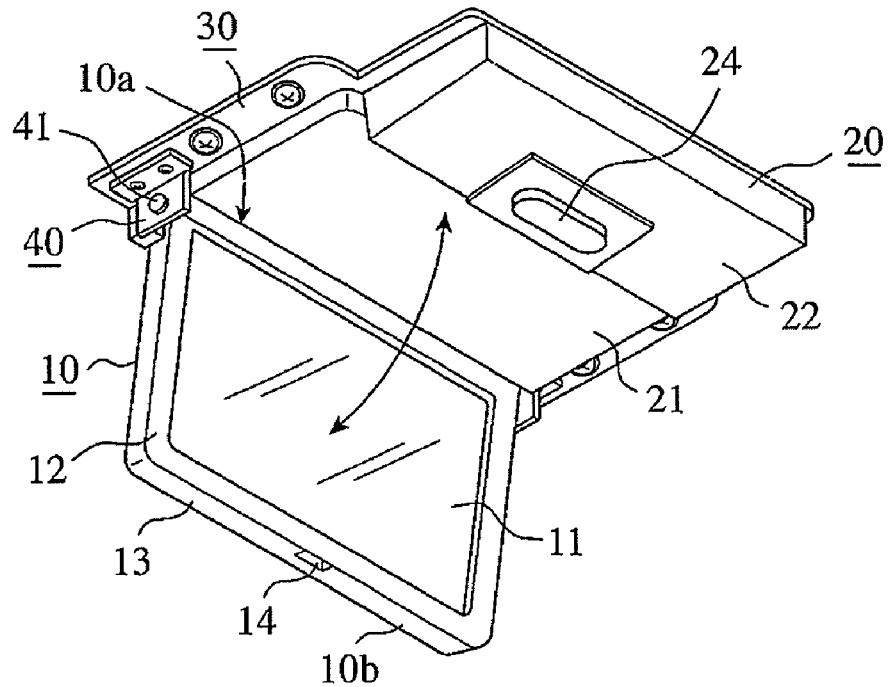
FIG. 1 is a perspective view showing the appearance of a retractable display apparatus in accordance with the first embodiment of the present invention.
Figure 2:
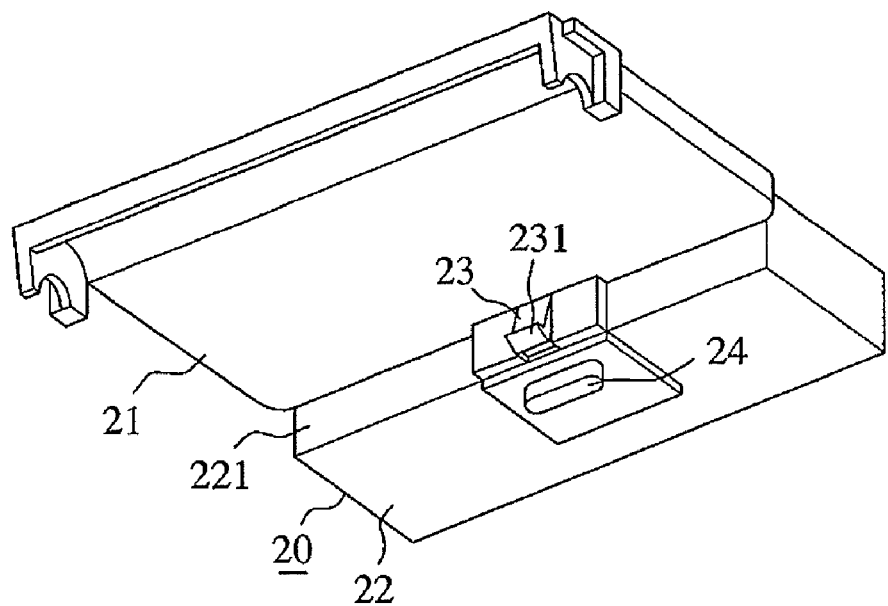
FIG. 2 is a perspective view showing the appearance of a structure portion made of a synthetic resin of a display unit.

FIG. 1 is a perspective view showing the appearance of a retractable or closable display apparatus in accordance with the first embodiment of the present invention. The retractable display apparatus shown in the figure is mounted on an automobile vehicle, and the figure illustrates a state where the display apparatus is used with a display panel 10 opened from a display unit 20 secured to the ceiling of a vehicle. FIG. 2 is a perspective view showing the appearance of the structure body part made of a synthetic resin of the display unit 20.

The display panel (first casing) 10 has an image display surface 11 such as a liquid crystal panel or the like, as is known, and is supported by hinges 40 attached on both the lengthwise ends of one side section 10a, rotatably with respect to the display unit (second casing) 20. To be specific, the display panel 10 is arranged to rotate around the shaft 41 of the hinges 40 such that the other side section 10b draws an arcs. Further, the display panel 10 includes a casing made of a synthetic resin and composed of a frame cover 12 housing display members and a back cover 13.

The display unit 20 is a structure body made of a synthetic resin, and includes a panel housing section 21 forming a housing space when the display panel 10 is closed and an operation box 22 formed integral with the panel housing section 21. The display unit 20 further has a base plate 30 made of a sheet metal, connected to the back thereof by screws. The base plate 30 is arranged to fix the hinges 40 thereon and be secured to the ceiling member of a vehicle by screws. The operation box 22 has provided on the side section 221 thereof facing the panel housing section 21, a movable type lock claw 23, which is outwardly energized by an elastic member. When the display panel 10 is housed in the panel housing section 21, the movable type lock claw 23 is inserted and locked by its claw section 231 to a rectangular lock hole 14 provided in the side section 10b opposite the side to which the hinges 40 of the display panel 10 are attached, thus locking and holding the display panel 10 so as not to be opened by the self-weight thereof. Otherwise, upon opening of the panel 10, the locking state of the movable type lock claw 23 can be released by pushing an open button 24. Note that the mechanism is commonly used. Moreover, the operation box 22 has attached thereon a variety of operation keys and a remotely controlling receiver for enjoying images and sounds on the display in addition to the above-discussed elements; however, those elements do not directly relate to the present invention, and thus these figures and explanations are omitted herein.

Figure 3:
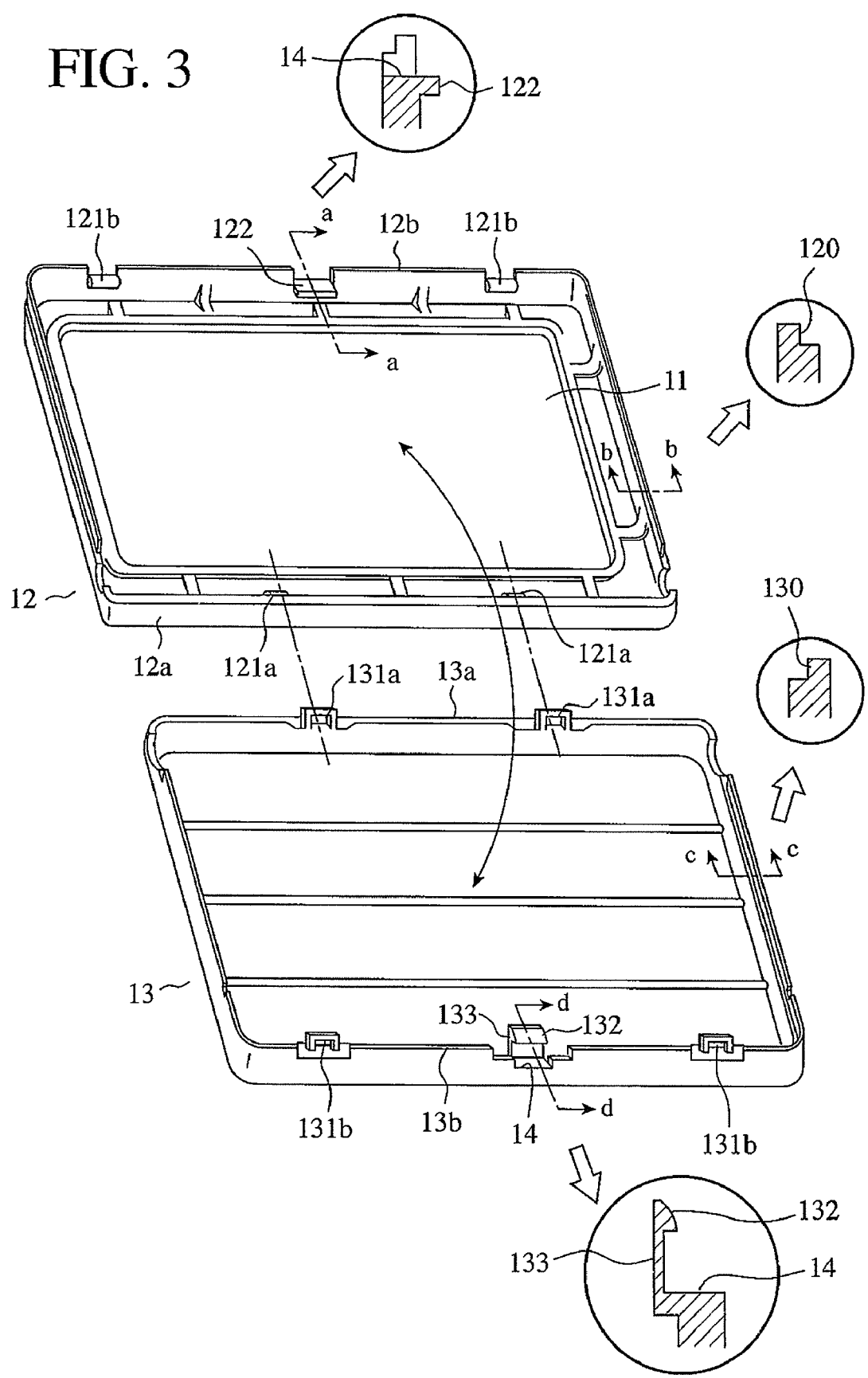
FIG. 3 is a perspective view showing the structure of the interior of the casing of a display panel in accordance with the first embodiment of the present invention.

FIG. 3 is a perspective view showing the structure of the interior of the casing of the display panel in accordance with the first embodiment of the present invention. Here, only the portions thereof directly relating to the present invention are explained, and thus explanations for the attaching structures of display members such as a liquid crystal panel and its peripheral circuit elements are omitted.

In the display panel 10, a pair of butt edge portions 12a, 12b in the lengthwise direction of the frame cover 12 have provided at the predetermined positions thereof, a plurality of semicylindrical bulges or projections 121a, 121b extending toward the interior of the display panel 10, respectively. Further, the rectangular lock hole 14 provided at the center of the butt edge portion 12b is provided with an angular piece section 122 such that the angular piece section inwardly extends. Meanwhile, a pair of butt edge portions 13a, 13b in the lengthwise direction of the back cover 13 have frame sections 131a, 131b provided at the positions opposed to the bulges 121a, 121b on the side of the frame cover 12, respectively. Furthermore, the rectangular lock hole 14 provided at the center of the butt edge portion 13b has provided at the internal front thereof, a flexible piece 133 uprising toward the side of the angular piece section 122 of the frame cover 12, and the flexible piece 133 has a hook section 132 provided at the free end thereof. Here, the bulges 121a, 121b and the frame sections 131a, 131b shall constitute a primary engaging means in the present invention, and the angular piece section 122 and the hook section 132 shall constitute a secondary engaging means therein. Besides, the butt edge portions of the frame cover 12 and the back cover 13 may have provided therealong engaging sections 120, 130 having a shape meshing with each other, if necessary.

Figure 4:
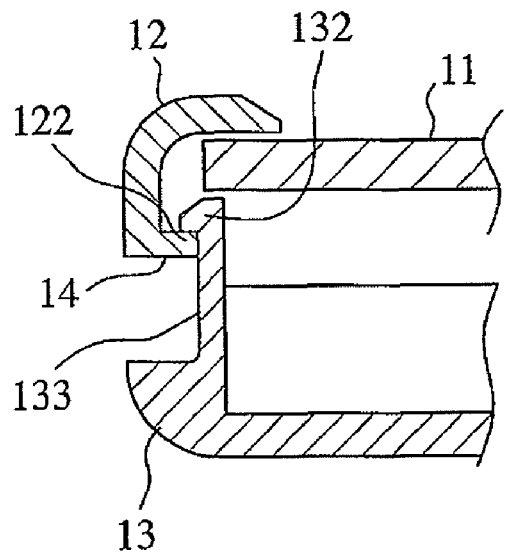
FIG. 4 is a sectional view showing a state where a hook section is engaged with an angular piece section, in accordance with first embodiment of the present invention.

Referring to FIG. 3, an assembly of the casing of the display panel 10 is carried out by attaching the display members and the rotation shaft to predetermined positions and butt-joining the frame cover 12 and the back cover 13 to fit engage the two covers. For this order, first, the bulges 121a of the butt edge portion 12a of the frame cover 12 are engaged into the frame sections 131a of the butt edge portion 13a of the back cover 13. Then, the hook section 132 of the butt edge portion 13b of the back cover 13 is engaged with the angular piece section 122 of the butt edge portion 12b of the frame cover 12. As the hook section 132 engages with the angular piece section 122, the bulges 121b are also engaged into the frame section 131b. In this case, the engaged state formed by the bulges 121a, 121b and the frame sections 131a, 131b (or by the primary engaging means) is a comparatively loosely bound one; thus under this engagement alone, the cover 12 and the back cover 13 may be easily disassembled. On the other hand, the engaged state established by the hook section 132 and the angular piece section 122 (or by the secondary engaging means) is a strongly connected one (locked state) as shown in FIG. 4, and thus the secondary engaging means can establish a fit state of the frame cover 12 and the back cover 13 in corporation with the primary engaging means. Therefore, the display panel 10 cannot be easily disassembled as long as the engaged state established by the secondary engaging means is not released. It should be understood that when an apparatus has a small-sized display panel as in the case of a portable apparatus, the casing thereof has small distortion, and thus the bulges 121b and the frame sections 131b in the butt edge portions 12b, 13b on the side provided with the rectangular lock hole 14 may be omitted.

Figure 5:
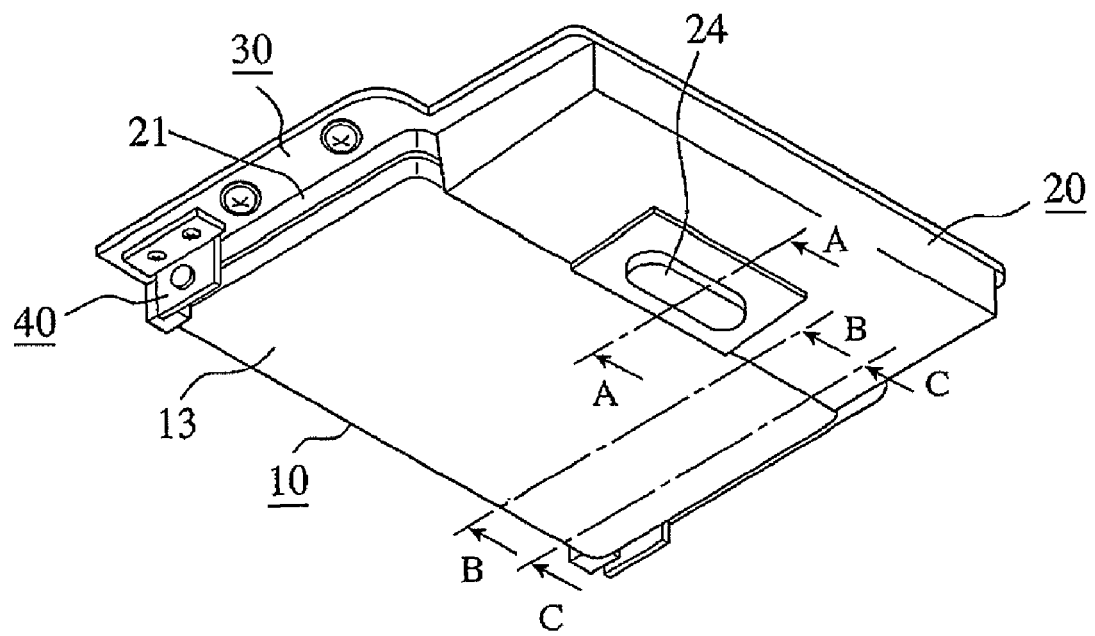
FIG. 5 is a front view showing a closed state of the retractable display apparatus in accordance with the first embodiment of the present invention.
Figure 6:
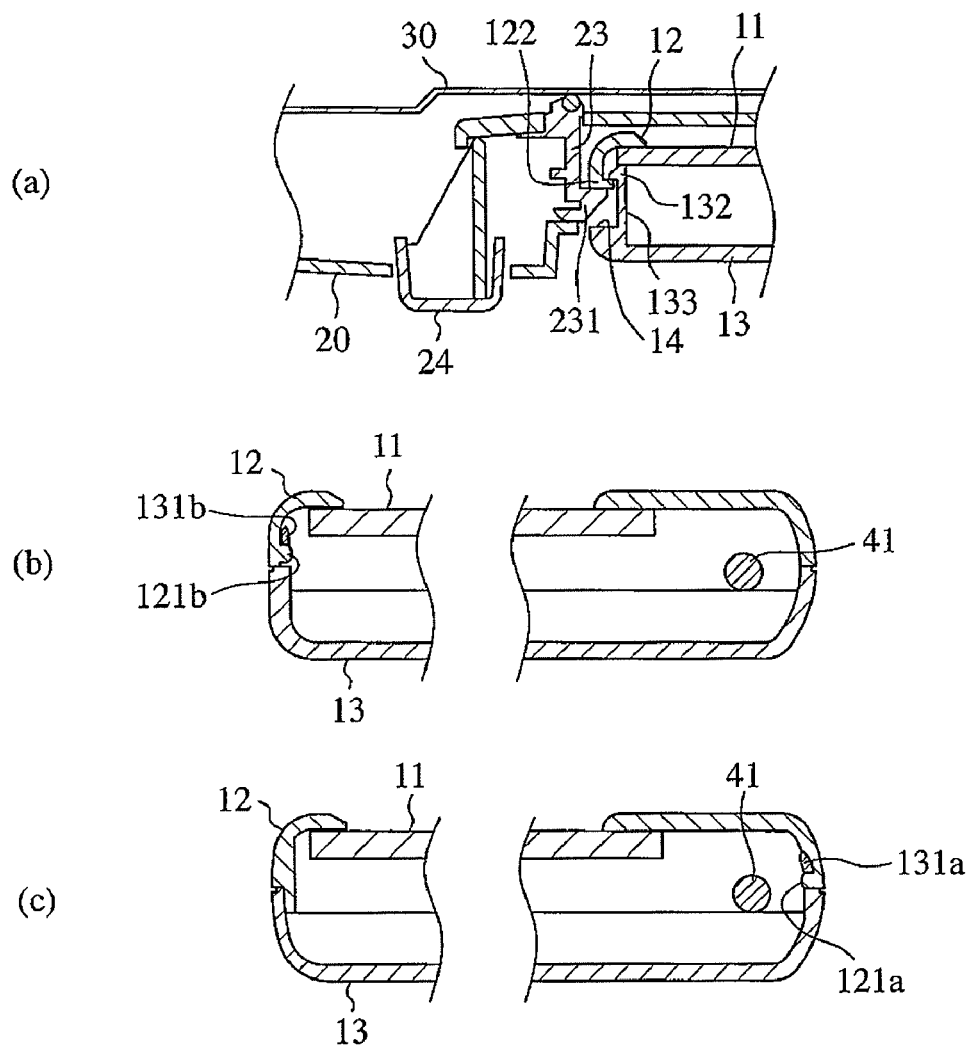
FIG. 6 is a sectional view showing an assembled state of each of the portions of the display panel in accordance with the first embodiment of the present invention.

FIG. 5 illustrates the closed state of the retractable display apparatus, and FIG. 6 illustrates the assembled state of each of the sections of the display panel. FIG. 6 (a) is a sectional view taken along the line A-A of FIG. 5, and shows a locked state where the claw section 231 of the movable type lock claw 23 of the display unit 20 is engaged in the rectangular lock hole 14 of the display panel 10, when the display unit 20 houses and holds the display panel 10 therein. The figure further illustrates the engaged state of the hook section 132 of the back cover 13 and the angular piece section 122 of the frame cover 12. FIG. 6 (b) is a sectional view taken along the line B-B of FIG. 5, and shows the engaged state of the bulges 121b of the frame cover 12 and the frame sections 131b of the back cover 13. FIG. 6 (c) is a sectional view taken along the line C-C of FIG. 5, and shows an engaged state of the bulges 121a of the frame cover 12 and the frame sections 131a of the back cover 13.

Figure 7:
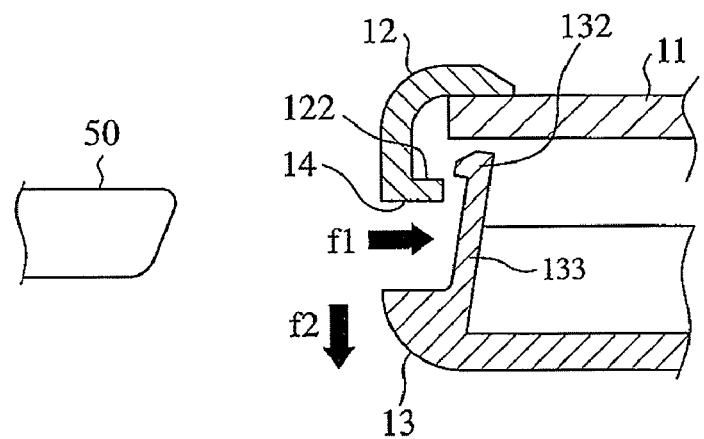
FIG. 7 is an explanatory view showing a disassembly method of the display panel in accordance with the first embodiment of the present invention.

A disassembly of the display panel 10 is performed by inserting a tool 50 into the rectangular lock hole 14 as shown in FIG. 7. When the flexible piece 133 of the hook section 132 is pushed toward the inside of the display panel 10 with a pressure f1, the hook section 132 is dislodged from the angular piece section 122. When a force f2 in the opposite direction to the frame cover 12 is exerted on the back cover 13 under such a condition, the back cover 13 is separated from the frame cover 12. At this state, as the back cover 13 is moved off the frame cover 12, the engaged states of the other bulges 121a, 121b and the frame sections 131a, 131b are also released.

For this reason, the display panel 10 can be disassembled by inserting a tool into the rectangular lock hole 14 for the movable type lock claw 23 to hold the display panel 10 in the display unit 20, which would eliminate the necessity for separately providing another hole into which the tool is inserted.

Figure 8:
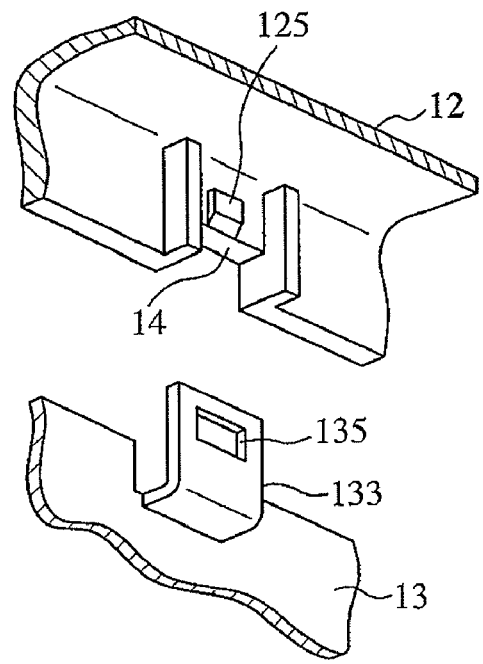
FIG. 8 is a perspective view partially broken away showing an example of another engaging structure in accordance with the first embodiment of the present invention.
Figure 9:
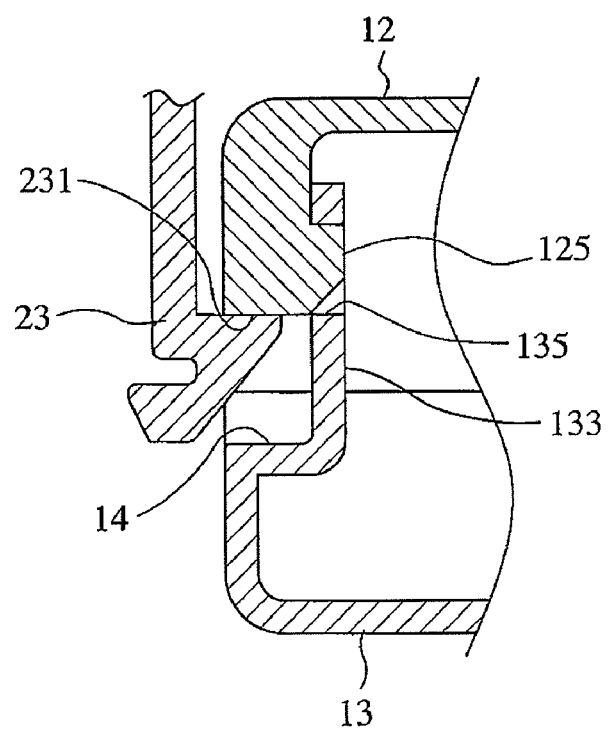
FIG. 9 is a sectional view showing an engaged state established by another engaging structure in accordance with the first embodiment of the present invention.

It should be appreciated that as for the positions at which the angular piece section 122 and the hook section 132 constituting the secondary engaging means are provided, their positions in the frame cover 12 and the back cover 13 may be interchanged. Further, instead of combining the angular piece section 122 and the hook section 132, the engaging means may be constituted by another structure, e.g., a rectangular frame 135 provided at the free end of the flexible piece 134 and an angular protrusion 125 as shown in FIG. 8 and FIG. 9.

As discussed above, in accordance with the first embodiment, the rectangular lock hole provided in the display panel 10, in which the movable type lock claw of the display unit 20 is inserted and locked in order to hold the display panel 10, is designed to have a structure where the rectangular lock hole can be also used as a hole into which a tool for disassembling the display panel 10 is inserted, and thus the rectangular lock hole is inconspicuous in design. Furthermore, the rectangular lock hole cannot be easily identified as a hole into which a tool is inserted, and thus the possibility that a user inserts a screw driver or the like thereinto to disassemble the casing as the user pleases can be reduced.

INDUSTRIAL APPLICABILITY

As discussed hereinabove, the retractable display apparatus according to the present invention is suitable for use, e.g., in a on-vehicle display apparatus, which is built by combining a first casing and a second casing and is installed on the ceiling of a vehicle, since a hole, into which a tool for disassembling the casing thereof is inserted, is provided at a place that cannot be easily found.

The invention claimed is:

1. A retractable display apparatus comprising a panel-shaped first casing having an image display surface; and a second casing that openably and closably supports the first casing with a hinge; the retractable display apparatus in which when the first casing is closed to the side of the second casing, the second casing holds the first casing by inserting and locking a releasably movable type lock claw provided in the second casing, in a rectangular lock hole provided in the side portion of the first casing opposite the side to which the hinges are attached,
    wherein the first casing composed of a frame cover and a back cover comprises:
    a plurality of primary engaging means provided at least in the butt edge portions on the side to which the hinges are attached, and engaging the butt edge portions, the plurality of primary engaging means being part of the frame cover and the back cover; and
    a secondary engaging means located internally in front of the rectangular lock hole, having a flexible piece extending from one of the covers toward the other thereof and engaging the other of the covers with the free end of the flexible piece; and
    wherein a fit state where the frame cover and the back cover are combined is established by both the engagements of the primary engaging means and the secondary engaging means, while the engagement of the primary engaging means is set in a releasable state by inserting a tool into the rectangular lock hole and inwardly flexing the flexible piece to release the secondary engaging means from the engagement.

2. The retractable display apparatus according to claim 1, wherein the first engaging means are also provided in the butt edge portions of the frame cover and the back cover on the side where the rectangular lock hole is provided.

3. The retractable display apparatus according to claim 1, wherein the first engaging means has semicylindrical bulges and frame sections engaging the corresponding bulges.

4. The retractable display apparatus according to claim 1, wherein the secondary engaging means has a hook provided at the free end of the flexible piece and an angular piece section engaging the hook.

5. The retractable display apparatus according to claim 1, wherein the secondary engaging means has a rectangular frame provided at the free end of the flexible piece and an angular projection which is inserted in the rectangular frame.

6. The retractable display apparatus according to claim 1, wherein the frame cover and the back cover each have an engaging section meshing with each other positioned anywhere within the butt edge portion except the positions where the primary engaging means and the secondary engaging means are formed.

* * * * *